(12) United States Patent
Saunders et al.

(10) Patent No.: US 9,544,722 B2
(45) Date of Patent: Jan. 10, 2017

(54) SYSTEM AND METHOD FOR LOCATING A CELLULAR COMMUNICATION DEVICE

(75) Inventors: Simon Saunders, West Sussex (GB); Anthony Timson, Surrey (GB)

(73) Assignee: REALCELL LIMITED, London (GB)

( * ) Notice: Subject to any disclaimer, the term of this patent is extended or adjusted under 35 U.S.C. 154(b) by 0 days.

(21) Appl. No.: 13/983,033

(22) PCT Filed: Feb. 3, 2012

(86) PCT No.: PCT/EP2012/051889
§ 371 (c)(1),
(2), (4) Date: Apr. 16, 2014

(87) PCT Pub. No.: WO2012/104425
PCT Pub. Date: Aug. 9, 2012

(65) Prior Publication Data
US 2014/0287772 A1 Sep. 25, 2014

(30) Foreign Application Priority Data
Feb. 3, 2011 (EP) .................................. 11250122

(51) Int. Cl.
*H04W 4/02* (2009.01)
*H04W 64/00* (2009.01)
(Continued)

(52) U.S. Cl.
CPC .............. *H04W 4/02* (2013.01); *H04W 4/028* (2013.01); *H04W 64/003* (2013.01); *H04W 84/045* (2013.01); *H04W 88/08* (2013.01)

(58) Field of Classification Search
CPC ...... H04W 84/045; H04W 4/02; H04W 48/16; H04W 88/08; H04W 48/08; H04W 12/08; H04W 48/02; H04W 48/20; H04W 8/20; H04W 8/22; H04W 12/06; H04W 36/14; H04W 4/025; H04W 4/22; H04W 60/00
(Continued)

(56) References Cited

U.S. PATENT DOCUMENTS 5,555,257 A * 9/1996 Dent ...................... H01Q 1/246
342/352
6,236,866 B1 * 5/2001 Meyer ................... H01Q 1/246
370/342

(Continued)

FOREIGN PATENT DOCUMENTS

EP 1227688 A1 7/2002
EP 2194739 A1 6/2010
(Continued)

OTHER PUBLICATIONS

International Search Report for PCT/EP2012/051889; Date of actual completion Apr. 2, 2012, date mailed Apr. 4, 2012; 4 pages.
(Continued)

*Primary Examiner* — Inder Mehra
(74) *Attorney, Agent, or Firm* — Schwabe, Williamson & Wyatt P.C.

(57) ABSTRACT

There is discussed a location system for locating the position of a mobile communications device that communicates with a communication network using wireless signals. The location system includes a receiver which detects a wireless signal transmitted between the mobile communications device and a base station forming part of the communication network, and a processing means which processes the detected wireless signal to extract identification information for the mobile communications device. The extracted identification is stored in a data store in association with data indicative of the base station. The processing means and the data store are independent from the communication net-
(Continued)

| Step | MS | Direction | BTS/NodeB |
|---|---|---|---|
| 1 | Mobile enters new Location Area (LAI) | | |
| 2 | Channel Request | → | |
| 3 | | ← | Immediate Assign |
| 4 | MM Location Update Request contains LAI, TMSI | → | |
| 8 | | ← | Optional Authentication Request contains RANDom number |
| 9 | Optional Authentication Response contains SRES (Signed Response to RAND) | → | |
| 10 | | ←→ | Cipher Mode / Security Command contains algorithm (A5, KASUMI, IK) |
| | CHANNEL NOW CIPHERED, INTEGRITY CHECKED AND UNREADABLE PASSIVELY | | |
| 11 | Cipher Mode Complete | → | |
| 12 | | ← | Optional TMSI Reallocation contains new TMSI for this Mobile |
| 13 | Optional TMSI Reallocation Complete | → | |
| 14 | | ← | Location Update Accept/Reject (if reject contains reject cause ie. cell not allowed) |
| 15 | | ← | Channel Release |

Femtocell Location Update Procedure. Steps 5, 6 and 7 are additional to a conventional Location Update Procedure and provide for a static Identity (the IMSI) which can be utilised to track a mobile between femtocells.

work, and therefore do not affect the operation of the mobile network.

20 Claims, 4 Drawing Sheets

(51) Int. Cl.
   *H04W 88/08* (2009.01)
   *H04W 84/04* (2009.01)
(58) Field of Classification Search
   USPC .................. 455/456.1, 456.5, 404.2, 456.3,
   456.4, 455/457, 435.1, 444, 446, 456.2;
   370/254, 328, 370/338, 352
   See application file for complete search history.

(56) References Cited

U.S. PATENT DOCUMENTS

| | | | |
|---|---|---|---|
| 2004/0002347 A1* | 1/2004 | Hoctor | H04B 1/7163 455/456.1 |
| 2004/0176103 A1 | 9/2004 | Trossen | |
| 2006/0030333 A1* | 2/2006 | Ward | G01S 5/0205 455/456.1 |
| 2010/0075698 A1* | 3/2010 | Rune | H04W 68/08 455/458 |
| 2010/0273504 A1* | 10/2010 | Bull | G01S 5/02 455/456.1 |
| 2010/0304764 A1* | 12/2010 | Sweeney | H04W 4/02 455/466 |
| 2011/0207461 A1* | 8/2011 | Lundqvist | H04W 24/02 455/436 |
| 2012/0149408 A1* | 6/2012 | Steer | H04W 76/023 455/466 |

FOREIGN PATENT DOCUMENTS

| | | | | |
|---|---|---|---|---|
| FR | EP0997977 | * | 5/2000 | ............ H01Q 17/00 |
| SE | EP2194739 | * | 6/2010 | ............ H04W 8/10 |
| WO | WO 98/10307 A1 | | 3/1998 | |

OTHER PUBLICATIONS

European Patent Office; EPO Extended European Search Report, EP application 11250122.6; dated Jul. 19, 2011; 9 pages.

* cited by examiner

| Step | MS | Direction | BTS/NodeB |
|---|---|---|---|
| 1 | Mobile enters new Location Area (LAI) | | |
| 2 | Channel Request | → | |
| 3 | | ← | Immediate Assign |
| 4 | MM Location Update Request<br>contains LAI, TMSI | → | |
| 5 | | ← | Identity Request (IMSI) |
| 6 | Identity Response (IMSI) | → | |
| 7 | IF IMSI IS NOT IN CLOSED USER GROUP GO TO STEP 14 WITH REJECT CAUSESUPPORTING "CELL NOT ALLOWED" | | |
| 8 | | ← | Optional Authentication Request<br>contains RANDom number |
| 9 | Optional Authentication Response<br>contains SRES (Signed Response to RAND) | → | |
| 10 | | ←→ | Cipher Mode / Security Command<br>contains algorithm (A5, KASUMI, IK) |
| | CHANNEL NOW CIPHERED, INTEGRITY CHECKED AND UNREADABLE PASSIVELY | | |
| 11 | Cipher Mode Complete | → | |
| 12 | | ← | Optional TMSI Reallocation<br>contains new TMSI for this Mobile |
| 13 | Optional TMSI Reallocation Complete | → | |
| 14 | | ← | Location Update Accept/Reject<br>(if reject contains reject cause ie. cell not allowed) |
| 15 | | ← | Channel Release |

Figure 3:Femtocell Location Update Procedure. Steps 5, 6 and 7 are additional to a conventional Location Update Procedure and provide for a static Identity (the IMSI) which can be utilised to track a mobile between femtocells.

SYSTEM AND METHOD FOR LOCATING A CELLULAR COMMUNICATION DEVICE

CROSS REFERENCE TO RELATED APPLICATIONS

This application is a 371 national phase of and claims priority to PCT/EP2012/051889, filed Feb. 3, 2012, which claims priority to EP 11250122.6, filed Feb. 3, 2011, all of which are incorporated by reference herein in their entirety.

STATEMENT REGARDING FEDERALLY SPONSORED RESEARCH OR DEVELOPMENT

Not applicable

NAMES OF PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA EFS

Not applicable

STATEMENT REGARDING PRIOR DISCLOSURES BY THE INVENTOR

Not applicable

BACKGROUND OF THE INVENTION

Field of the Invention

This invention concerns locating a cellular communication device which communicates with base stations of a wireless communication network such as a public land mobile network (PLMN).

Various exemplary embodiments of the invention will now be described with reference to the attached figures in which.

BRIEF DESCRIPTION OF THE DRAWINGS

DETAILED DESCRIPTION OF THE INVENTION

By monitoring the location of a cellular communication device over time, the invention allows the movement of the cellular communication device to be tracked. The present invention takes advantage of, but may operate independently from, the standard operation of a wireless communication network. As such, embodiments of the invention may be implemented without any involvement by the operator of the wireless communication network.

It is well known that wireless communication networks keep track of the location of cellular communication devices (hereafter referred to as cellular phones for convenience). In particular, the wireless communication network typically covers a plurality of location areas with each location area corresponding to a plurality of cells (a cell being the area covered by one base station antenna) which are adjacent to each other. Even when the cellular phone is not engaged in a voice call or a data transfer session, the wireless communication network knows the location area in which the cellular phone is located.

In particular, each location area is assigned a Location Area Code, and the Location Area Code is broadcast by all the base stations within the location area at regular intervals. Even when a cellular phone is not engaged in a voice call or a data session (known as idle mode in the UMTS), a cellular phone receives and monitors the Location Area Codes broadcast by the cells which they are currently monitoring. When a cellular phone in one location area reaches a boundary with another location area, the cellular phone detects a new Location Area Code and in response sends a request message to the core network of the Wireless Communication Network (known as a LOCATION UPDATING REQUEST in UMTS). This request message includes limited information on the identity of the subscriber for the cellular phone. Request messages are also sent by the cellular phone when a timer expires (known as periodic updating in UMTS). The length of this timer is set by the operator of the wireless communication system, and is typically at least 60 minutes.

Following receipt of the request message, the core network either accepts or rejects the request depending on the permissions associated with the subscriber. If the subscriber is not permitted to access the new location area (for example because that would constitute unauthorised roaming), the wireless communication network sends a reject message (known as the LOCATION UPDATING REJECT message in UMTS), which indicates the reason why the request has not been allowed.

The location area updating procedure discussed above allows the location of the cellular phone to be determined to a limited extent, but is not an efficient method of location determination for two main reasons. Firstly, the position of each location area boundary is typically selected by the operator of the wireless communication network to minimise the number of messages sent by the cellular phone, and is therefore located away from busy traffic locations (i.e. locations where cellular phones would be crossing the location area boundaries on a frequent basis). Location areas are rather large, consisting typically of tens or even hundreds of cells. Thus location area updates triggered by crossing location area boundaries set by the operator of the wireless communication network are rather infrequent and may not occur at locations where it is desirable to determine the location of the cellular phone. Secondly, the interval between periodic updating messages is rather long, making it difficult to determine the location when the cellular phone is moving at high speed or when it is desired to determine the location of the cellular phone to a high degree of precision.

The present invention addresses the problem of providing an improved technique for determining the location of a cellular phone without requiring the cooperation of the operator of a wireless communication network. Aspects of the invention are set out in the accompanying claims.

A preferred embodiment of the invention takes advantage of femtocells, which are short range cells having base stations (hereafter referred to as femtocell base stations) which comply with the communication standards of an associated wireless communication network and sends wireless signals in the frequency spectrum licensed to that wireless communication network. However, the positioning of a femtocell base station is not fixed by the operator of the wireless communication network but rather by the user of the femtocell base station. Further, the user of the femtocell base station can set rules as to who is permitted to communicate via the femtocell base station. Typically, a femtocell base station is connected to the remainder of a wireless communication network via a consumer broadband connection, and these rules enable the user to limit who can send signals along that consumer broadband connection. A femtocell is assigned a Location Area Code which differs from the Location Area Codes of the surrounding cells of the wireless communication network.

Femtocells are provided for in many communication standards. In the 3GPP UMTS standards, femtocells are referred to as Home NodeB's, while in the 3GPP LTE standards femtocells are referred to as Home eNodeB's. In the 3GPP2 standards, femtocells are simply referred to as femtocells, while in the WiMAX standards femtocells are referred to as femtocell access points. However, the term femtocell is recognised to cover generically this terminology, and accordingly for the sake of clarity the terminology femtocell and femtocell base station will be followed.

The apparatus for implementing the present invention may take advantage of existing femtocell base stations or other base stations of the wireless communication network (for example picocell base stations). Alternatively, the apparatus for implementing the invention may be sold in conjunction with one or more femtocell base stations.

Briefly, the apparatus for implementing the invention includes a receiver which detects the wireless signals transmitted during a location update procedure, and a processor which extracts identification information from the wireless signals and sends the extracted identification information to a database for storage in conjunction with data identifying the femtocell base station (or other type of base station). A receiver may monitor wireless signals communicated to and from plural femtocell base stations, and the database may store location data provided by plural receivers. In this way, by suitable positioning of the location area boundaries for a plurality of femtocell base stations within an area of interest, the movement of a cellular phone through the area of interest can be tracked.

Femtocells typically have a closed user group which is set by the end user. Only cellular phones within that closed user group can gain service on the femtocells. This is done in order to ensure that the femtocell, which is typically an end user purchase, does not carry traffic from other users passing by but remains dedicated to the purchaser. This in turn prevents the Internet connection of the end user purchaser from being overly utilised.

As the positioning of a femtocell base station is typically carried out by the end user, one or more femtocell base stations can be deliberately positioned so that their respective location area boundaries are positioned in a desired manner. In some embodiments of the invention, means are provided for adjusting the coverage area of a femtocell base station to allow greater control of the positioning of the associated location area boundary.

The present invention is particularly useful for tracking the movement of a cellular phone through a confined area of interest, such as a shopping centre or an airport.

Figure 1:
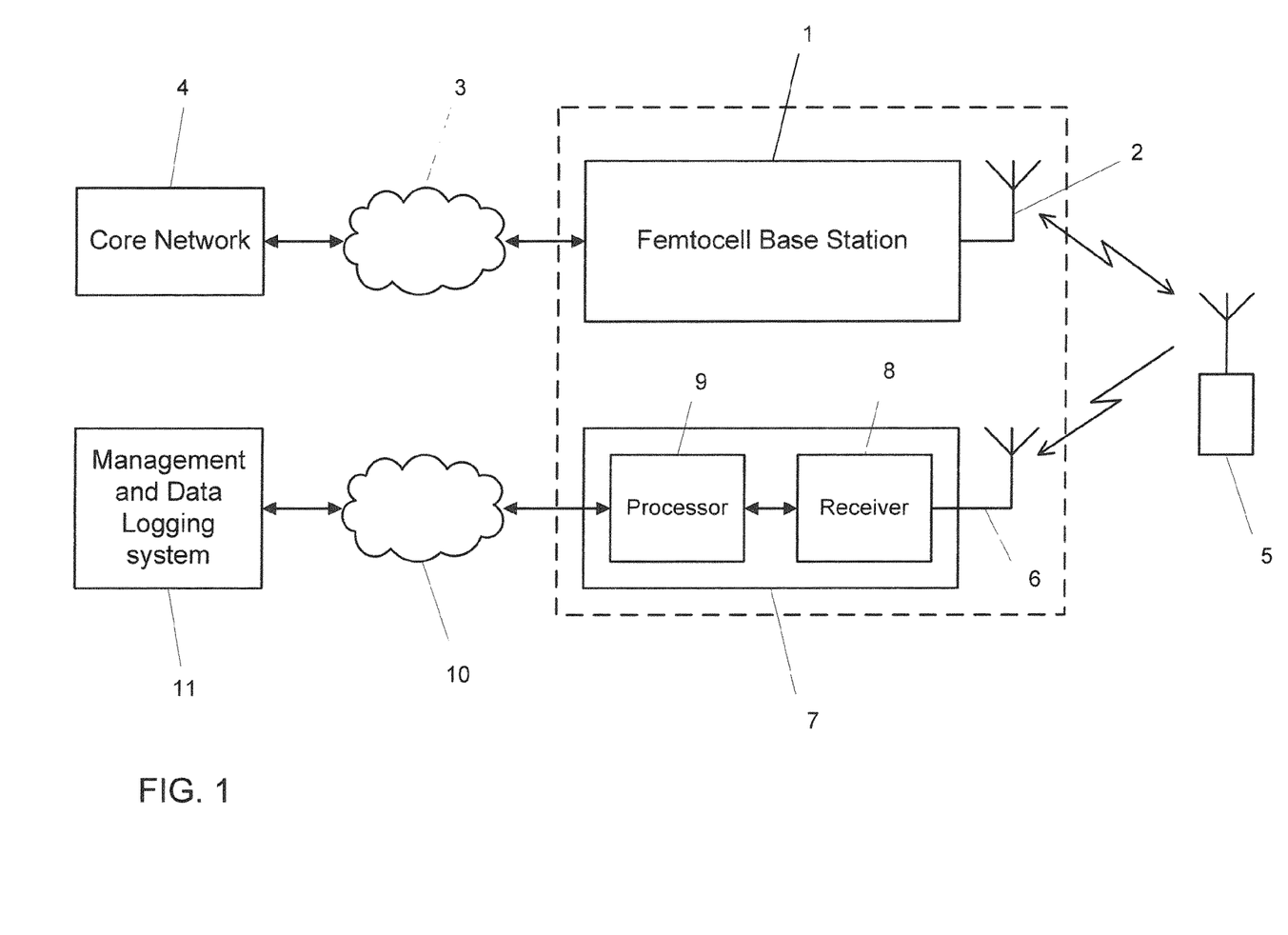
FIG. 1 is a block diagram schematically showing a cellular phone, a femtocell base station system and a location system according to a first embodiment of the invention.

As shown in FIG. 1, in an embodiment of the invention a conventional femtocell base station 1 transmits signals to and receives signals from a cellular phone 5 of a subscriber to a wireless communication network via an antenna 2 forming part of the femtocell base station 1. The femtocell base station 1 is connected to the core network and associated management systems 4 of the wireless communication network via the internet 3, for example via a conventional consumer broadband connection. In this embodiment, the wireless communication network is a conventional terrestrial cellular network and the operation of the femtocell 1, the core network 4 and the Internet 3 are unchanged from conventional operation and accordingly the invention has no impact on the operation of the wireless communication network.

In this embodiment, the femtocell base station 1 is installed together with an independent monitoring device 7. The monitoring device 7 may be a femtocell modified to only receive and process uplink messages or equivalently replaced by any other device capable of receiving and decoding the transmissions from the cellular phone 5. The operation of the monitoring device 7 is independent from the operation of the wireless communication network, and no data is transferred between the monitoring device 7 and the core network 4 of the wireless communication network.

The monitoring device 7 is connected to its own antenna 6, which receives signals transmitted within a similar (but not necessarily identical) area to the antenna 2. In fact, due to the use of different separation codes or scrambling codes on the uplink channels of same frequency systems such as UMTS, it is possible to use one monitoring device 7 to collect data from several femtocells 1 and determine which femtocell 1 performed the Location Update procedure based on the separation code.

The monitoring device 7 also includes receiver circuitry 8 which is connected to the antenna 6 and detects transmitted signals, and a processor 9 which processes the detected signals to extract identification information for the cellular phone 5. In this embodiment, the monitoring device 7 is connected to a management and data logging system 11 via a network 10, which may be the Internet or a private local area network. The operation of the management and data logging system 11 is also independent from the operation of the wireless communication network, and no data is transferred between the management and data logging system 11 and the core network 4 of the wireless communication network.

In normal operation, the femtocell base station 1 transmits a different Location Area Code to the surrounding base stations of the wireless communication network in order to trigger all cellular phones entering its coverage area to perform a Location Update. As a result, when the cellular phone 5 comes into range of the femtocell base station 1, the cellular phone transmits a LOCATION UPDATING REQUEST message to the femtocell base station 1. In this embodiment, the femtocell base station 1 is set to have a closed user group consisting of very few or no cellular phones. For cellular phones not within the closed user group, as will be discussed in more detail hereafter, following receipt of the LOCATION UPDATING REQUEST the femtocell base station 1 sends a LOCATION UPDATING REJECT message and the subsequent voice and data calls of the mobile are carried using base stations of the wider wireless communication network rather than the femtocell base station 1.

In accordance with the invention, the monitoring device 7 detects the LOCATION UPDATING REQUEST message from the cellular phone 5, and logs the identity of the cellular phone 1 and the time of receipt of the message, which is sent to the management and data logging system 11 and stored. In this way, the location of the cellular phone 1 at a particular time is determined and stored.

Figure 2:
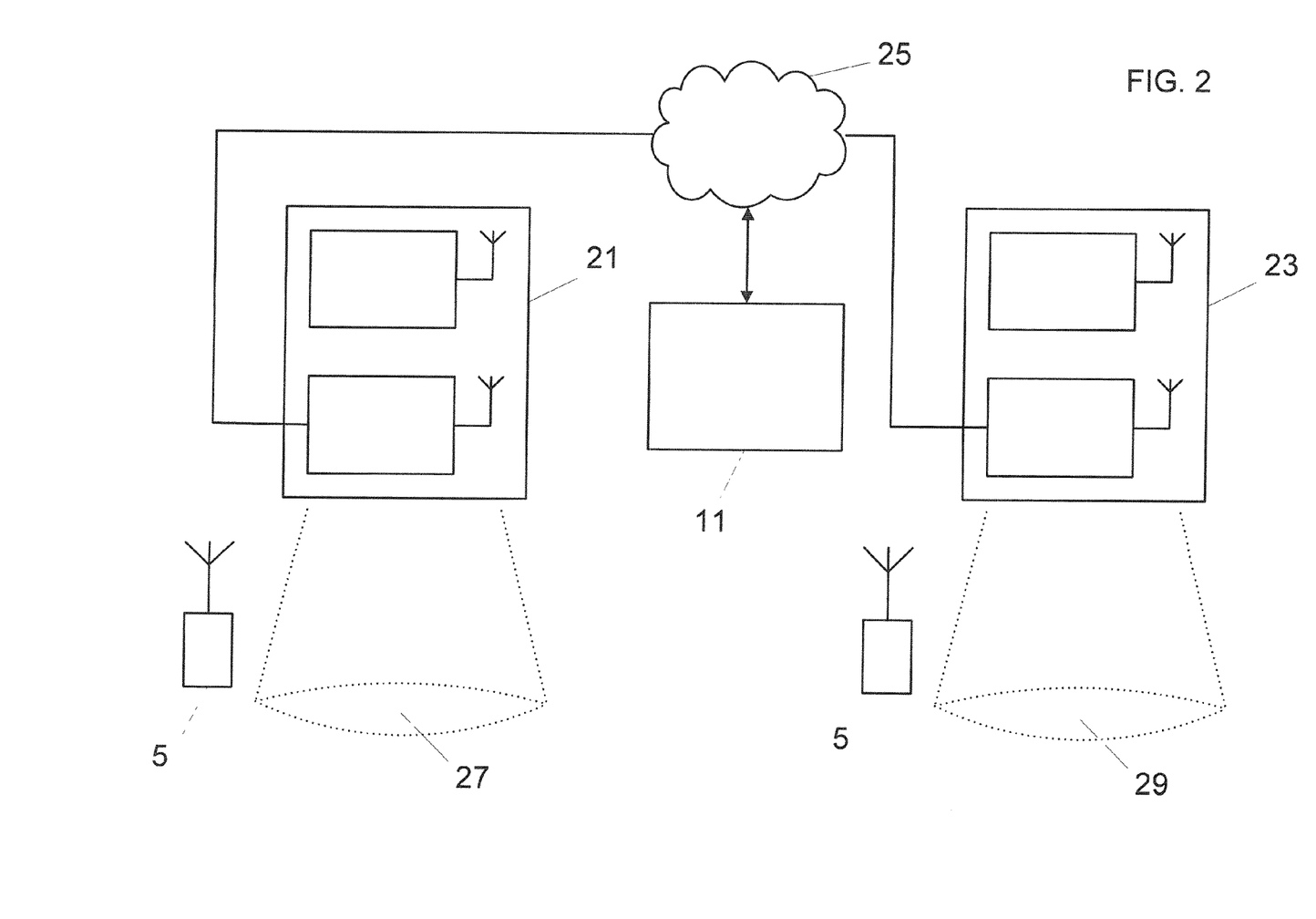
FIG. 2 is a block diagram illustrating a cellular phone moving from a first femtocell to a second femtocell.

For ease of illustration, in FIG. 1 the management and data logging system 11 is shown connected to a single monitoring device 7. However, the management and data logging system 11 could be connected to multiple monitoring devices, each of which monitors signals transmitted to and from a respective group of one or more femtocells. For example, FIG. 2 shows two sub-systems 21 and 23 which each contain a femtocell base station which is connected via the Internet to an operator network (connection not shown). Each sub-system 21, 23 also contains an independent monitoring device connected, via a local area network 25, to the management and data logging system 11. A cellular phone 5 approaching the boundary of the coverage area 27 of the femtocell base station of the first sub-system 21 sends a LOCATION UPDATING REQUEST to initiate a location updating procedure which is monitored by the monitoring receiver of the first sub-system 21, and the time is logged in the management and data logging system 11 together with the identity of the cellular phone 5 and the identity of the femtocell base station with which the cellular phone 5 is communicating. When the cellular phone 5 subsequently approaches the boundary of the coverage area 29 of the femtocell base station of the second sub-system 23, the cellular phone 5 sends another LOCATION UPDATING REQUEST to initiate another location updating procedure, which is monitored by the monitoring receiver within the second sub-system 23, and the time is logged by the management and data logging system 11 along with the identity of the cellular phone and the identity of the femtocell base station with which the cellular phone 5 is communicating.

By comparing the logged mobile subscriber identities and determining that they are from the same subscriber, the system 11 can track the movement of the cellular phone 5 and determine the time taken by the cellular phone 5 to move from the boundary of one cell to the boundary of another cell. The number of monitoring devices 7 connected to the management system 11 may be further increased to increase the number of locations tracked.

Figure 3:
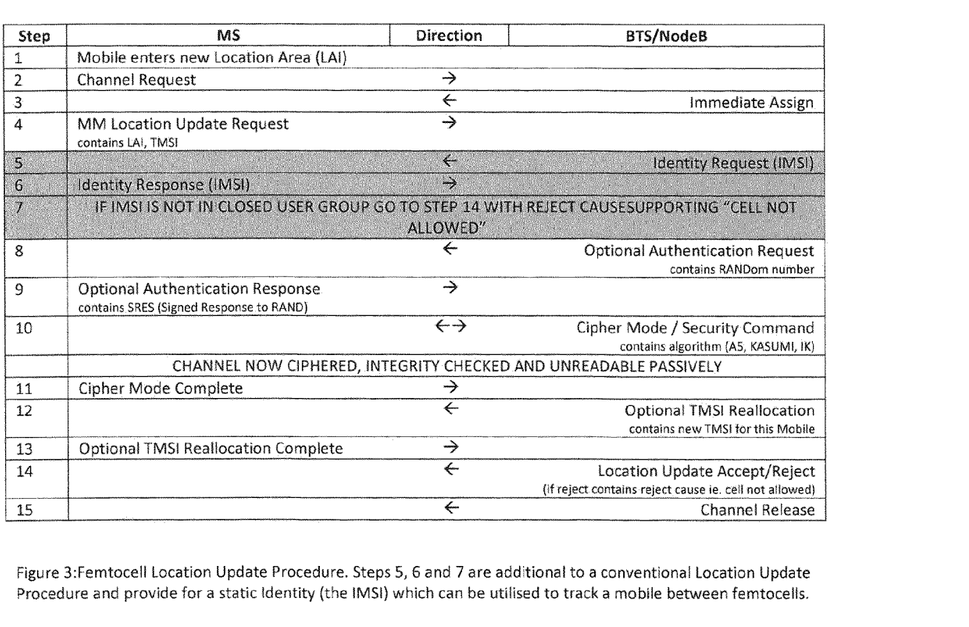
FIG. 3 is a table showing a simplified subset of the signaling-performed in a location update procedure involving a femtocell base station.

The way in which the femtocell base station 1, and similarly the monitoring device 7, determines the identity of the cellular phone 5 will now be described with reference to FIG. 3. As shown in FIG. 3, after the cellular phone (referred to as Mobile and MS in FIG. 3) enters the Location Area of the femtocell base station (referred to as BTS/NodeB in FIG. 3), the cellular phone 5 requests a channel and the femtocell base station assigns the channel. The cellular phone 5 then transmits a LOCATION UPDATING REQUEST to the Femtocell Base Station 1. This LOCATION UPDATING REQUEST specifies the location area code and a Temporary Mobile subscriber Identifier (TMSI) which had previously been assigned to the subscriber who owns the cellular phone 5 and is only valid for a limited period of time. TMSIs are used to reduce the number of times that the International Mobile Subscriber Identity (IMSI), a number uniquely assigned to the subscriber of the cellular phone, needs to be transmitted to the wireless communication network to improve security. The IMSI is a well-known identifier to those in the art, and it is possible to determine from the first 6-digits the Mobile Country Code and the Mobile Network Code. These values will identify a subscriber's SIM card to a country and a network anywhere in the world. This, in combination with the remaining digits, provides a unique identifier as a full IMSI is used only once worldwide.

In order to determine the identity of the cellular phone 5, the femtocell base station 1, and similarly the monitoring device 7, needs to know the IMSI. Accordingly, in step 5 of FIG. 3, the femtocell base station 1 transmits an IDENTITY REQUEST to the cellular phone 5 requesting the IMSI of the subscriber for the cellular phone 5. In reply, the cellular phone 5 transmits, in step 6 of FIG. 3, an IDENTITY RESPONSE to the femtocell base station 1 providing the IMSI.

The femtocell base station 1 then checks if the IMSI is in the closed user group for that femtocell. FIG. 3 then proceeds to show the steps taken if the IMSI is in the closed user group, which optionally involves setting up a ciphered channel and allocating a new TMSI to the subscriber of the cellular phone. However, as discussed above, in this embodiment of the invention the closed user group list contains either no or very few IMSIs, and accordingly the femtocell base station 1 will deny most LOCATION UPDATING REQUESTS.

The requirement for the femtocell base station to determine the IMSI for a subscriber of a cellular phone is advantageous as it allows the monitoring device 7 to identify the cellular phone unambiguously. However, the TMSI itself is useful identification data and alternatively the monitoring device could only extract the TMSI, or could extract the TMSI and the IMSI.

As mentioned above, there are security concerns relating to transmitting the IMSI. In this embodiment, potential security and data protection issues associated with utilising the full IMSI in a tracking database are avoided by obfuscating all but the first six digits of the IMSI through a one-way non-reversible hash with a low collision ratio. Maintaining the first six digits, i.e. the Mobile Country Code and the Mobile Network Code, provides useful marketing information for some applications.

Modifications and Further Embodiments

In the embodiment discussed above, the coverage area of a femtocell base station determines the boundaries at which location updating is performed. In order to determine the location with greater precision, the coverage area of the transmitting femtocell base station can be modified by a variety of means. With all the means described, no adjustment to the operation of the operator equipment (i.e. the femtocell base station) is required.

Figure 4A:
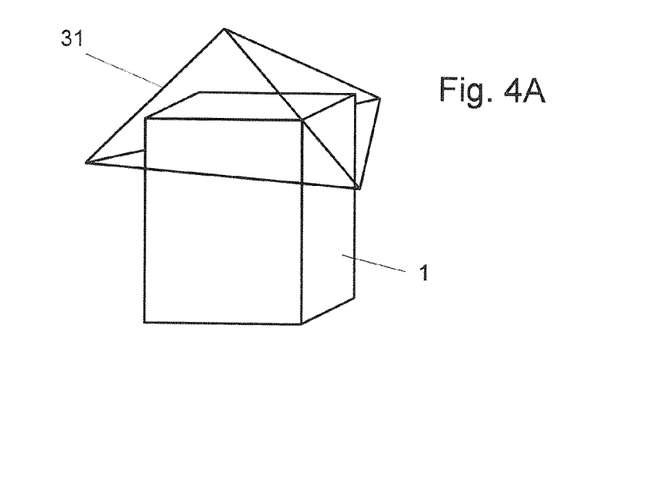
FIG. 4A shows a femtocell base station together with a reflecting surface for modifying the coverage area of the femtocell base station.

In FIG. 4A, the femtocell base station 1 is surrounded by a reflecting surface 31 which is shaped in order to direct the radiation from the femtocell base station 1 to a restricted area with more sharply defined edges than the coverage area of the unmodified femtocell base station 1. The shape of the reflecting surface 31 can be adjusted by one skilled in the art in a variety of ways, for example the use of three perpendicular conducting sheets which form a corner reflector to direct the radiation substantially downwards in a limited area.

Figure 4B:
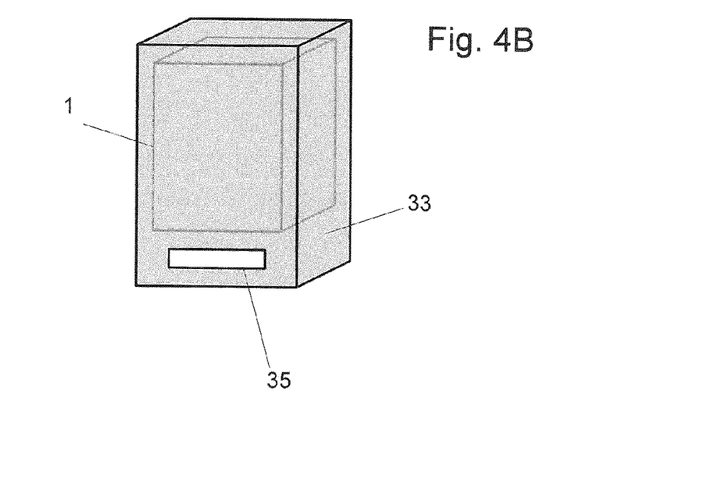
FIG. 4B shows a femtocell base station encased in a shielded case having a slot which acts as a slot or aperture antenna.

In FIG. 4B, the femtocell base station 1 is encased in a shielded case 33 which contains all radiation from the femtocell base station except that allowed to pass through a slot 35, the size and shape of which is designed to act as a slot or aperture antenna and thereby to have preferential radiating characteristics.

Figure 4C:
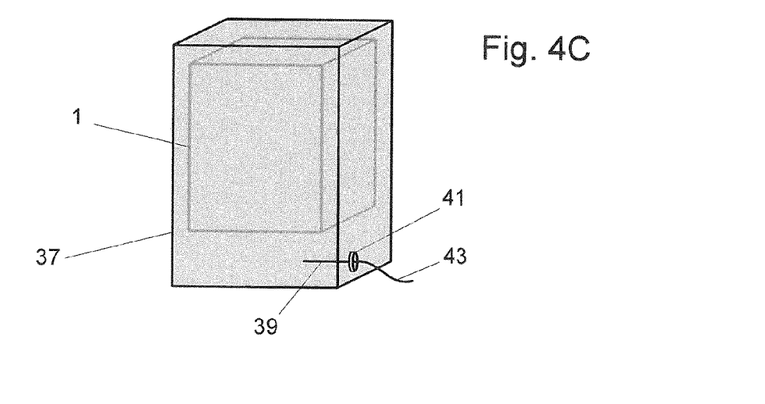
FIG. 4C shows a femtocell base station entirely encased in a shielded case with an antenna internal to the case connected to an antenna external to the case.

In FIG. 4C, the femtocell base station 1 is encased entirely in a shielded case 37. A conducting probe 39 is inserted into the shielded case with a position, size and shape chosen to maximally receive and transmit radiation from and to the femtocell base station 1. The probe 39 is connected to a connector 41 which permits the connection of a cable 43. The cable 43 can then be connected to any standard antenna or antenna system which has preferential properties for controlling the location area constituted by the operator femtocell 1.

To determine with which of a plurality of femtocell base stations a cellular phone is communicating, as discussed above the scrambling code or separation code may be used. Those skilled in the art will appreciate that other techniques are possible, for example using the channelization code or the cell global identification code.

In an embodiment of the invention, the monitoring device 7 monitors the configuration (such as channel number and scrambling codes) of one or more femtocell base stations 1 within a receive range, and self-configures to monitor communication to and from the one or more femtocell base stations. This facilitates a simple and highly effective monitoring network that could adapt to independently-controlled changes in the operation of a femtocell base station being monitored by the wireless communication network to which it is attached.

In the described embodiment, the boundaries between different Location Area Codes in a circuit-switched network are used. Alternatively, it is a perfectly workable solution to substitute a Routing Area Code (RAC) and Routing Area Update in the Packet Switching context for LAC and Location Area Update in the Circuit Switching context of GSM/GPRS and UMTS. For networks such as CDMA, the Area Identifier (AID) and Mobile Identification Number (MIN) could correspond equivalently to LAC and IMSI. Other suitable forms of mobile identification number could be the IMEI, or electronic serial number or any other identity requested by the femtocell and transmitted by the cellular phone.

Although the described embodiment refer to cellular phones (sometimes also referred to as mobile phones), those skilled in the art will recognise that the invention could be used to determine the location of other types of mobile communication device, for example personal digital assistants (PDAs), laptop computers, mobile broadband USB dongles and the like.

The invention claimed is:

1. A location system for locating the position of a mobile communications device, the mobile communications device being operable to communicate with a communication network using wireless signals, the location system comprising:
   a receiver operable to detect a wireless signal transmitted between the mobile communications device and a base station forming part of the communication network, wherein said receiver comprises means for detecting the configuration of the base station, wherein the means for detecting is arranged to pre-configure said receiver to detect said wireless signal transmitted between said mobile communications device and said base station;
   means for processing the detected wireless signal to extract identification information for the mobile communications device; and
   means for storing said identification information in association with data indicative of the base station, wherein said processing means and said storing means are configured so that no data is transferred between the processing means and a core network of the communication network and no data is transferred between the storing means and the core network of the communication network, whereby the location system is implementable without involvement of the operator of the communication network.

2. A location system according to claim 1, wherein the storing means is arranged to store the identification information in association with data indicative of the base station and a time stamp.

3. A location system according to claim 1, wherein the processing means is arranged to extract the identification information for the mobile communications device from a message sent by the mobile communications device in response to a message broadcast by the base station conveying a location code.

4. A location system according to claim 1, wherein the receiver is operable to detect wireless signals between a mobile communications device and a plurality of different base stations.

5. A location system according to claim 4, wherein said plurality of different base stations comprise base stations for more than one communication network.

6. A location system according to claim 4, wherein said processing means is operable to determine the base station associated with the wireless signal from a scrambling, channelization, separation or cell global identity code used for the wireless signal.

7. A location system according to claim 1, wherein the communications network includes a femtocell base station, and wherein the receiver is operable to detect a wireless signal transmitted between the mobile communications device and the femtocell base station.

8. A location system according to claim 7, wherein the receiver has a receiver antenna arranged to receive signals within a similar area to an antenna of the femtocell base station antenna.

9. A location system according to claim 7, wherein the femtocell base station has a closed list of mobile communication devices which are permitted to use telecommunication services provided by the femtocell base station, and
   wherein the storing means is operable to store identification information corresponding to mobile communications devices not included in said closed list.

10. A location system according to claim 7, further comprising means for adjusting the coverage area of the femtocell base station.

11. A location system according to claim 10, wherein said adjusting means comprises means for partially surrounding the femtocell base station with at least partially absorbent material to reduce the coverage area.

12. A location system according to claim 10, wherein said adjusting means comprises means for reflecting the wireless signals from said femtocell base station into a restricted area.

13. A location system according to claim 10, wherein said adjusting means comprises a case for enclosing the femtocell base station, wherein the case comprises an aperture arranged to direct wireless signals from the femtocell base station to a restricted area.

14. A location system according to claim 1, wherein said receiver is operable to detect said wireless signal without establishing a link with said mobile communications device and said base station.

15. A location system for locating the position of a mobile communications device, the mobile communications device being operable to communicate with a communication network using wireless signals, the location system comprising:
- a receiver operable to detect a wireless signal transmitted between the mobile communications device and a base station forming part of the communication network;
- means for processing the detected wireless signal to extract identification information for the mobile communications device; and
- means for storing said identification information in association with data indicative of the base station;
- wherein said processing means and said storing means are independent from the communication network;
- further comprising a femtocell base station, and wherein the receiver is operable to detect a wireless signal transmitted between the mobile communications device and the femtocell base station;
- further comprising means for adjusting the coverage area of the femtocell base station; and wherein said adjusting means comprises:
- a case for enclosing the femtocell base station, said case including a conducting probe for receiving wireless signals from and transmitting wireless signals to the femtocell base station; and
- an antenna system connectable to said conducting probe from the outside of the case, wherein the antenna system is operable to provide a different coverage area to that of the femtocell base station.

16. A location system according to claim 1 comprising a plurality of receivers, each receiver being operable to detect wireless signals between a mobile communication device and at least one femtocell base station,
- wherein said processing means comprises means for processing the wireless signals detected by the plurality of receivers, and
- wherein the storing means is arranged to store retrieved identification information, in association with data indicating the corresponding femtocell base station and timing information, in a database common to all the receivers.

17. A method of locating the position of a mobile communications device which communicates with a communication network using wireless signals, the method comprising:
- detecting wireless signals transmitted between the mobile communications device and a base station and retrieving identification information for the mobile communications device conveyed by the wireless signals, wherein said detecting comprises detecting the configuration of the base station by pre-configuring a receiver to detect said wireless signals transmitted between said mobile communications device and said base station; and
- storing said identification information in association with data indicative of a location associated with the base station in a database which is independent from the communication network; such that no data is transferred between the database and a core network of the communication network, whereby the method is implementable without involvement of the operator of the communication network.

18. A method according to claim 17, wherein the base station is a femtocell base station and the method further comprising positioning the femtocell base station so that a location area boundary for the femtocell base station is in a desired position.

19. A method according to claim 18, wherein the femtocell base station has a closed list of mobile communication devices which are permitted to use telecommunication services provided by the femtocell base station, and
- said storing comprises storing identification information corresponding to mobile communications devices not included in said closed list.

20. A method according to claim 18, wherein the femtocell base station broadcasts a wireless signal conveying a location code, and the identification information is retrieved from a wireless signal sent in response to said wireless signal conveying the location code.

* * * * *